(12) United States Patent
Noda

(10) Patent No.: US 7,532,154 B2
(45) Date of Patent: May 12, 2009

(54) FREQUENCY MODULATION RADAR DEVICE

(75) Inventor: Shinsaku Noda, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 11/927,910

(22) Filed: Oct. 30, 2007

(65) Prior Publication Data

US 2008/0278368 A1    Nov. 13, 2008

(30) Foreign Application Priority Data

May 10, 2007    (JP)    ............................... 2007-125520

(51) Int. Cl.
*G01S 13/42* (2006.01)
(52) U.S. Cl. .................. 342/107; 342/113; 342/133; 342/139; 342/146; 342/147; 342/192; 342/194; 342/195; 342/196; 342/417; 342/444
(58) Field of Classification Search ............ 342/13, 342/56, 59, 107–109, 113, 133, 139, 146–147, 342/192–196, 417, 443–444
See application file for complete search history.

(56) References Cited

U.S. PATENT DOCUMENTS

| | | | | |
|---|---|---|---|---|
| 5,262,789 A * | 11/1993 | Silverstein | ................ | 342/368 |
| 5,943,013 A * | 8/1999 | Ohashi | ................ | 342/417 |
| 6,008,759 A * | 12/1999 | Tangemann et al. | ......... | 342/368 |
| 6,018,317 A * | 1/2000 | Dogan et al. | ................ | 342/378 |
| 6,351,238 B1 * | 2/2002 | Kishigami et al. | .......... | 342/445 |
| 6,404,379 B1 * | 6/2002 | Yu et al. | ................ | 342/80 |
| 6,480,139 B1 * | 11/2002 | Hoctor | ................ | 342/13 |
| 7,277,047 B1 * | 10/2007 | Mookerjee et al. | .......... | 342/195 |
| 7,358,891 B2 * | 4/2008 | Struckman et al. | .......... | 342/156 |
| 7,432,849 B2 * | 10/2008 | Noda | ................ | 342/70 |
| 2007/0008210 A1 * | 1/2007 | Kibayashi et al. | ............. | 342/70 |
| 2008/0224918 A1 * | 9/2008 | Shimizu | ................ | 342/147 |
| 2008/0231505 A1 * | 9/2008 | Zhu et al. | ................ | 342/350 |
| 2008/0238761 A1 * | 10/2008 | Noda | ................ | 342/70 |
| 2008/0278368 A1 * | 11/2008 | Noda | ................ | 342/133 |

FOREIGN PATENT DOCUMENTS

| | | |
|---|---|---|
| JP | 04-318700 A | 11/1992 |
| JP | 2004112508 A | 4/2004 |
| JP | 2006-047282 A | 2/2006 |

OTHER PUBLICATIONS

Japanese Office Action dated Dec. 2, 2008.

* cited by examiner

*Primary Examiner*—John B Sotomayor
(74) *Attorney, Agent, or Firm*—Sughrue Mion, PLLC

(57) ABSTRACT

The frequency modulation radar device includes a transmitting unit (5), M receiving units for receiving a reflected signal as M channels, a mixing unit (7) for mixing the transmitting signal with the M received signals to obtain beat signals for the M channels, a frequency analyzing unit (9) for analyzing the beat signals for the M channels in frequency, and a calculating unit (1) for calculating a distance to a target object and an orientation angle based on frequency analysis results. The calculating unit (1) calculates a noise level from the frequency analysis result, extracts a peak signal of a subject target object in each of the channels based on the calculated noise level to generate a covariance matrix, discriminates between a signal eigenvalue and a noise eigenvalue among M eigenvalues of the covariance matrix, and estimates the number of incident signals based on the number of signal eigenvalues.

11 Claims, 4 Drawing Sheets

FREQUENCY MODULATION RADAR DEVICE

BACKGROUND OF THE INVENTION

1. Field of the Invention

The present invention relates to a frequency modulation radar device that obtains the orientation angles of a plurality of incident signals by using a plurality of receivers.

2. Description of the Related Art

As a receiving device that obtains a plurality of orientation angles by using a plurality of receivers, there is a receiving device that generates a covariance matrix by using time series data from a plurality of received signals that are generated by a plurality of sensors, and obtains the first eigenvalues of the covariance matrix (for example, see JP 2004-112508 A).

JP 2004-112508 A discloses a technique in which the second eigenvalues of the covariance matrix is obtained by using the time series data in a state where there is no observation signal, to thereby discriminate between a signal eigenvalue corresponding to a target object and a noise eigenvalue corresponding to noises among the first eigenvalues based on the second eigenvalues.

SUMMARY OF THE INVENTION

However, the conventional art suffers from the following problems.

In the conventional receiving device, in order to obtain the second eigenvalues, it is necessary to obtain the time series data in a state where there is no observation signal in addition to the time series data for observation of the target object, and thus it takes much time to acquire necessary data. It is also necessary to analyze the eigenvalue in order to obtain the second eigenvalues, and thus it takes much time to conduct processing.

In addition, because the state where there is no observation signal occurs depending on the surrounding environments, it is impossible to steadily obtain the second eigenvalues. Further, because the first eigenvalues and the second eigenvalues are obtained from the separate time series data, it is impossible to respond to characteristic change that is caused by the temperature characteristic or the like due to a time difference between the first eigenvalues and the second eigenvalues.

The present invention has been made to solve the above-mentioned problems, and therefore an object of the present invention is to provide a frequency modulation radar device that is capable of accurately estimating the number of incident signals even in the case where there occurs a characteristic change due to the temperature characteristic or the like, without requiring the acquisition of the time series data in a state where there is no observation signal and the calculation of the eigenvalues.

A frequency modulation radar device of the present invention includes: transmitting means for transmitting a transmitting signal that has been modulated in frequency so as to change a frequency at a constant change rate with time; and M receiving means for receiving a reflected signal resulting from reflecting the transmitting signal by a target object as M channels, where M is an integer of 2 or larger. Also, the frequency modulation radar device includes: mixing means for mixing the transmitting signal with the M received signals, respectively, to obtain beat signals for the M channels; frequency analyzing means for analyzing the beat signals for the M channels in frequency; and calculating means for calculating a distance to the target object and an orientation angle based on frequency analysis results for the M channels.

In the frequency modulation radar device, the calculating means calculates a noise level from the frequency analysis results for the M channels, extracts a peak signal of a subject target object in each of the channels based on the calculated noise level to generate a covariance matrix of M×M order, discriminates between a signal eigenvalue corresponding to the target object and a noise eigenvalue corresponding to noises among M eigenvalues of the covariance matrix based on the noise level, estimates the number of incident signals K, where K is an integer that is equal to or larger than 1 but smaller than M, from the number of the discriminated signal eigenvalues, and calculates the orientation angles of the respective K incident signals to estimate the orientation angle of the target object.

According to the present invention, a peak signal and a noise level are extracted from an observation signal including information on the target object, the number of signal eigenvalues is obtained from a covariance matrix that has been generated based on the extracted peak signal, and the number of incident signals is estimated based on the number of signal eigenvalues. As a result, there can be obtained a frequency modulation adar device which is capable of accurately estimating the number of incident signals even in the case where there occurs a characteristic change due to the temperature characteristic or the like, without requiring the acquisition of the time series data in a state where there is no observation signal and the calculation of the eigenvalues.

DETAILED DESCRIPTION OF THE PREFERRED EMBODIMENTS

Now, a description will be given of a frequency modulation radar device below according to a preferred embodiment of the present invention with reference to the accompanying drawings.

First Embodiment

Figure 1:
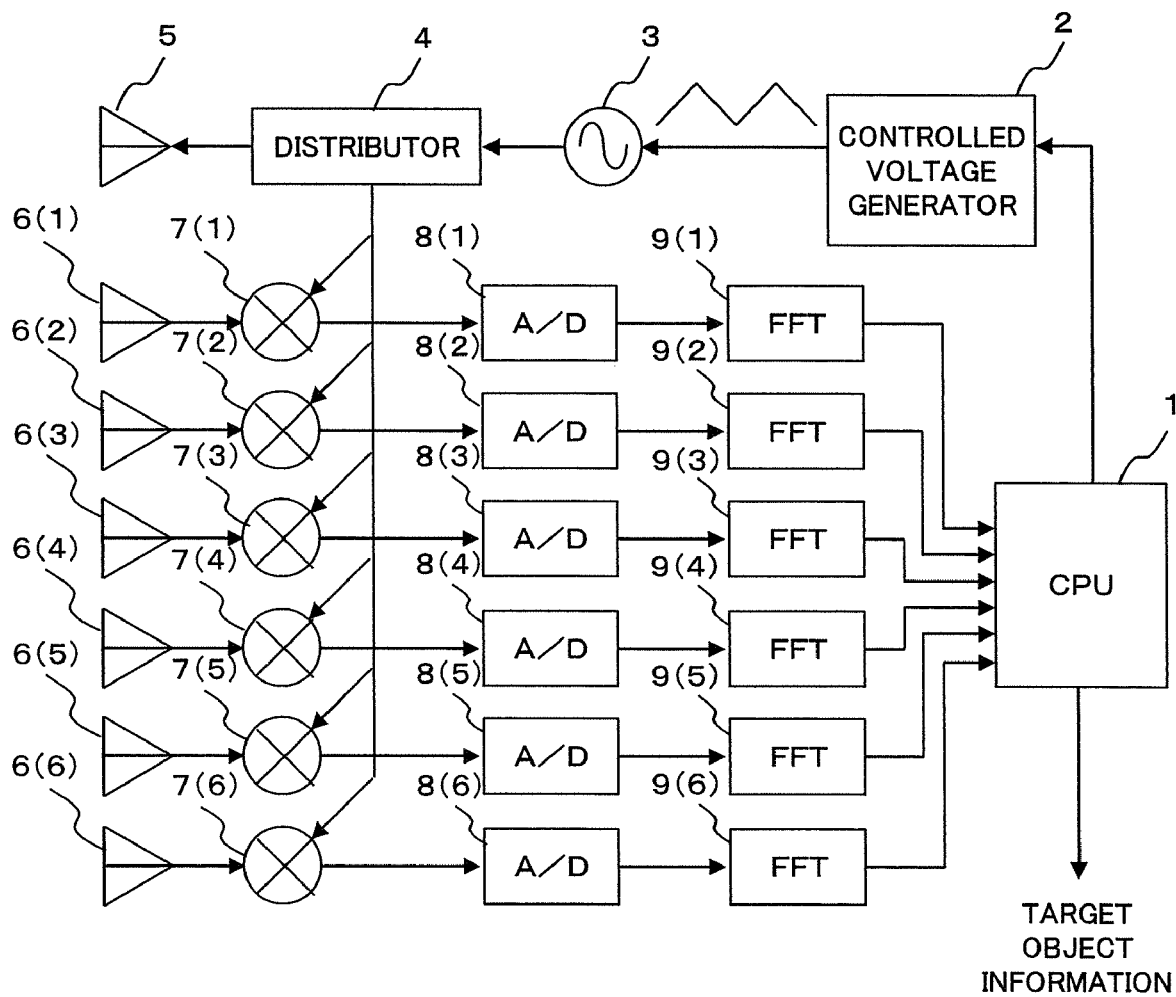
FIG. 1 is a structural diagram showing a frequency modulation radar device according to a first embodiment of the present invention.

FIG. 1 is a diagram showing a configuration of frequency modulation radar device according to a first embodiment of the present invention. In this example, the frequency modulation radar device receives reflection signals as received signals for six channels, and includes a CPU 1, a controlled voltage generator 2, a voltage controlled oscillator (VCO) 3, a distributor 4, a transmitting antenna 5, receiving antennas 6(1) to 6(6), mixers 7(1) to 7(6), A/D converters 8(1) to 8(6), and fast Fourier transform (FFT) calculators 9(1) to 9(6).

In the following, a description will be given of the operation of the frequency modulation radar device according to the first embodiment. First, the CPU 1 outputs a modulation start command to the controlled voltage generator 2. The controlled voltage generator 2 generates a triangular controlled voltage according to the modulation start command, and applies the controlled voltage to the VCO 3. The VCO 3 outputs a transmitting signal that has been subjected to frequency modulation according to the triangular controlled voltage. The distributor 4 distributes the output transmitting signal to the transmitting antenna 5 and the six mixers 7(1) to 7(6).

The transmitting antenna 5 emits the transmitting signal toward a target object (not shown). On the contrary, the six receiving antennas 6(1) to 6(6) receive the signals that have been reflected by the target object as receiving signals for six channels (CH1 to CH6). The six receiving antennas 6(1) to 6(6) are linearly arranged so as to be apart from each other by a distance d.

The mixers 7(1) to 7(6) that are disposed in correspondence with the six receiving antennas 6(1) to 6(6), respectively, mix the respective receiving signals that have been received by the receiving antennas 6(1) to 6(6) with the transmitting signals that have been distributed by the distributor 4 to generate beat signals for six channels.

The A/D converters 8(1) to 8(6) convert the mixed beat signals into digital data in an up section where the frequency increases with time and in a down section where the frequency decreases with time, respectively.

The FFT calculators 9(1) to 9(6) conduct the frequency analysis using the FFT, individually, calculate the complex spectrum for the six channels in the up section and the down section, respectively, and transmit the calculation results to the CPU 1.

The CPU 1 calculates the orientation angle of the target object based on the calculated complex spectrum. The technical feature of the present invention resides in that the orientation angle can be specified by accurately estimating the number of incident signals even in the case where there occurs a characteristic change due to the temperature characteristic or the like, without requiring the acquisition of the time series data in a state where there is no observation signal and the calculation of the eigenvalues. Specific processing that is conducted by the CPU 1 will be described below with reference to a flowchart.

Figure 2:
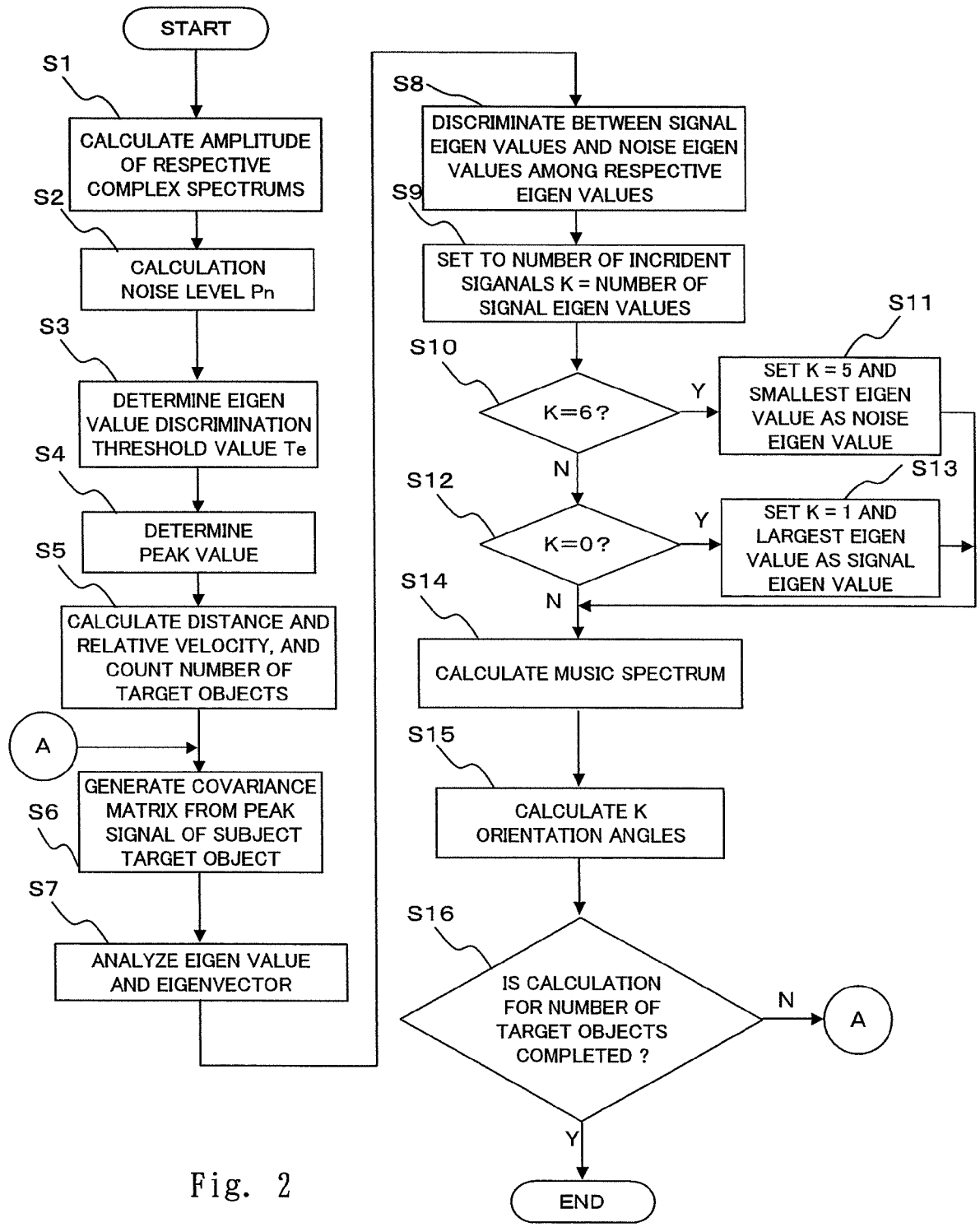
FIG. 2 is a flowchart showing a series of processing of orientation angle calculation of the frequency modulation radar device according to the first embodiment of the present invention.

FIG. 2 is a flowchart showing a series of processing of orientation angle calculation of the frequency modulation radar device according to the first embodiment of the present invention. First, in Step S1, the CPU 1 finds the amplitudes of the complex spectrums of the input beat signals for six channels, respectively.

Figure 3:
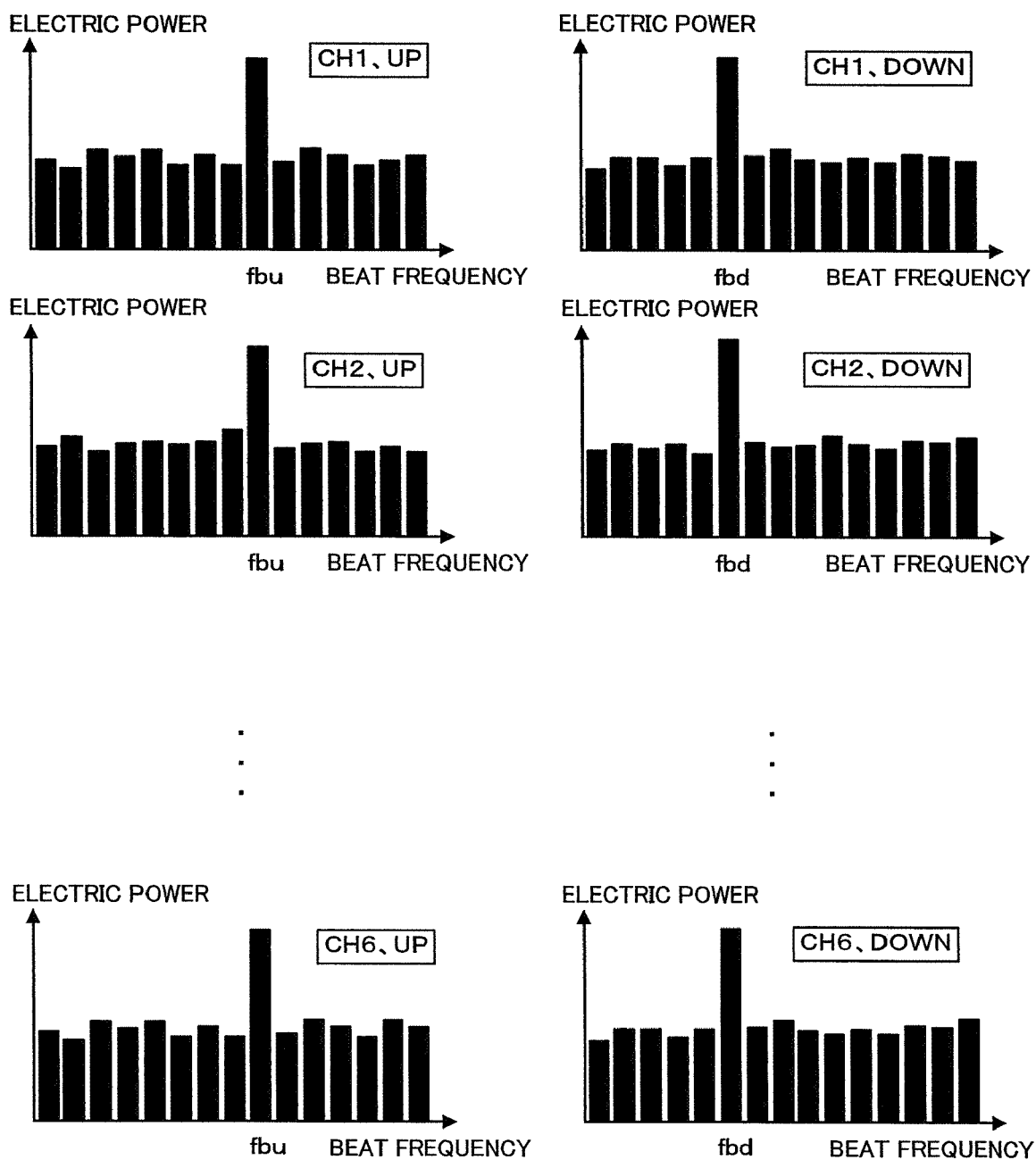
FIG. 3 is a diagram showing the amplitude calculation results of complex spectrum of the frequency modulation radar device according to the first embodiment of the present invention.

FIG. 3 is a diagram showing the amplitude calculation results of the complex spectrum of the frequency modulation radar device according to the first embodiment of the present invention. The CPU 1 calculates the square of absolute values of the respective complex spectrums in the up section and the down section, respectively, for each of the channels. As a result, it is possible to obtain the amplitude value of an electric power with respect to the beat frequency, as shown in FIG. 3.

Subsequently, in Step S2, the CPU 1 calculates a noise level Pn as a mean value of the noise amplitude value. As a specific method, it is possible that the CPU 1 finds a mean value Pa of all the amplitude values that have been obtained in the above Step S1, assumes a value obtained by multiplying Pa by a given value as a provisional threshold value Tt, regards the amplitude values that are equal to or smaller than the provisional threshold value Tt as noises, and again calculates a mean value of only noises as the noise level Pn.

In this example, Pn can be regarded as an estimate value that is in proportion to the variance (represented by $\sigma^2$) of noises included in the received signal. What times of the variance $\sigma^2$ is Pn is determined with respect to the resolution of the A/D converters 8(1) to 8(6), the number of FFTs, or the like. In the first embodiment, a multiple signal classification (MUSIC) method is used as the orientation angle estimating method of the incident signal as will be described below.

The MUSIC method has been well known as disclosed in, for example, JP 2003-270316 A. In this example, according to the disclosure of paragraphs 0020 and 0021 of JP 2003-270316 A, the eigenvalues $\lambda_1$ to $\lambda_6$ of the covariance matrix of the incident signal (arranged in the descending order) are expressed as the following Equation (1) when the number of incident signals is K.

$$\lambda_1 \geq \ldots \geq \lambda_K > \lambda_{K+1} = \ldots = \lambda_6 = \sigma^2 \tag{1}$$

In this case, $\lambda_1$ to $\lambda_K$ are eigenvalues (signal eigenvalues) that are caused by the contribution of noises and the signals, and $\lambda_{K+1}$ to $\lambda_6$ are eigenvalues (noise eigenvalues) that are caused by the contribution of noises only. The above Equation (1) is met as the mean value. In a case where the covariance matrix is generated based on the limited number of observation signals in the real radar operation as in the first embodiment, because noises are superimposed on the respective eigenvalues, the respective eigenvalues have variations from the relationship of the above Equation (1).

Accordingly, in the first embodiment, as a eigenvalue discrimination threshold value Te for discriminating between the signal eigenvalues and the noise eigenvalues, a value, obtained by multiplying the variance $\sigma^2$ that is the mean value, by a predetermined constant, which takes the variation into consideration, is set. As a result, it is possible to conduct the stable discrimination not depending on the state of the incident signal. Further, as described above, because the noise level Pn is the estimate value that is in proportion to the variance $\sigma^2$, the eigenvalue discrimination threshold value Te is given by the following Equation (2) in the first embodiment.

$$T_e = \alpha \cdot P_n \tag{2}$$

In the above Equation (2), $\alpha$ is a constant that is predetermined by an experimental method and the like. As a method of obtaining the estimate value of the variance $\sigma^2$, the method of the first embodiment based on the noise level Pn has the mean value of a large number of sample points such that Pn is substantially the number of FFTs. As a result, as compared with the method based on $\lambda_{K+1}$ to $\lambda_6$ that are the noise eigenvalues of the covariance matrix, it is possible to estimate the number of incident signals with high reliability and high precision.

Further, the threshold value is set to constant multiples of the noise level, thereby making it possible to discriminate between the signal eigenvalues and the noise eigenvalues by an appropriate signal to noise ratio according to the required false alarm probability, and to accurately estimate the number of incident signals.

Under the circumstances, the CPU 1 determines the eigenvalue discrimination threshold value Te based on the above Equation (2) in Step S3.

Subsequently, in Step S4, the CPU 1 searches the peak signal from the amplitude values that have been obtained in the above Step S1. First, the CPU 1 sets the following Equation (3) as the peak signal discrimination threshold value Tp.

$$T_p = \beta \cdot P_n \tag{3}$$

In the above Equation (3), β is a constant that is determined according to a predetermined false alarm probability. An amplitude value that is larger than Tp and also larger than the amplitude values of beat frequencies before and after the amplitude value is set as a peak signal corresponding to the target object, and the beat frequency of the peak signal is set as fbu in the up section and fbd in the down section.

Subsequently, in Step S5, the CPU 1 finds a distance R and a relative velocity V of the target object from the beat frequencies fbu and fbd of the obtained peak signal based on the principle of the general frequency modulation continuous wave (FMCW) radar. That is, the CPU 1 calculates the distance R and the relative velocity V through the following Equations (4) and (5).

$$R = \frac{cT}{4f_m}(f_{bu} + f_{bd}) \quad (4)$$

$$V = -\frac{c}{4f_c}(f_{bu} - f_{bd}) \quad (5)$$

In the above Equations (4) and (5), c is the velocity of light, T is a modulation time, fm is a frequency modulation width, and fc is a carrier wave frequency. In addition, in Step S5, the CPU 1 counts the number of the detected target objects, and stores the counted number of the target objects in a storage unit (not shown in FIG. 1).

Subsequently, in Step S6, the CPU 1 generates the covariance matrix to be used in the MUSIC method. The covariance matrix Rc of 6×6 order is expressed by the following Equation (6).

$$R_c = \begin{bmatrix} X_1 \cdot X_1^* & X_1 \cdot X_2^* & \ldots & X_1 \cdot X_6^* \\ X_2^* \cdot X_1^* & X_2 \cdot X_2^* & \ldots & X_2 \cdot X_6^* \\ \vdots & \vdots & \ddots & \vdots \\ X_6 \cdot X_1^* & X_6 \cdot X_2^* & \ldots & X_6 \cdot X_6^* \end{bmatrix} \quad (6)$$

In the above Equation (6), Xi is the complex spectrum of the peak signal in an i-th channel (CHi). Xi* represents a complex conjugate of Xi.

Then, in Step S7, the CPU 1 analyzes the eigenvalue and the eigenvector with respect to the covariance matrix Rc, and finds the eigenvalues $\lambda_1$ to $\lambda_6$ and the eigenvectors $e_1$ to $e_6$ corresponding to the respective eigenvalues $\lambda_1$ to $\lambda_6$. In this example, the eigenvalues $\lambda_1$ to $\lambda_6$ and the eigenvectors $e_1$ to $e_6$ of 6×1 order corresponding to the respective eigenvalues $\lambda_1$ to $\lambda_6$ are rearranged in the descending order of magnitude of the eigenvalues.

In addition, in Step S8, the CPU 1 discriminates the calculated eigenvalues $\lambda_1$ to $\lambda_6$ as the signal eigenvalues when the calculated eigenvalues $\lambda_1$ to $\lambda_6$ are equal to or larger than the eigenvalue discrimination threshold value Te that has been obtained in the above Step S3, and as the noise eigenvalues when the calculated eigenvalues $\lambda_1$ to $\lambda_6$ are smaller than the eigenvalue discrimination threshold value Te, respectively.

Then, in Step S9, the CPU 1 sets the number of incident signals K to the number of eigenvalues that have been discriminated as the signal eigenvalues in the above Step S8. It should be noted that the number of incident signals that can be estimated by the covariance matrix of M×M order theoretically is equal to or less than M−1 (for example, see IEEE Transactions on Acoustics, Speech, and Signal Processing, Vol. ASSP-33, No. 2, April 1985, pp. 387 to 392).

Accordingly, in a case where all of the eigenvalues $\lambda_1$ to $\lambda_6$ are equal to or larger than Te in the above step S8, that is, in a case where the number of incident signals K is 6, it can be considered that the false determination is made by an influence such as noise.

In such a case, K is corrected to 5, and $\lambda_6$ that is the smallest eigenvalue is regarded as the noise eigenvalue as shown in Steps S10 and S11. With such a correction, it is possible to accurately estimate the number of incident signals K without mistaking the number of incident signals K due to an influence such as noise.

The operation of the covariance matrix Rc is conducted on the peak value where it is determined that there exists the target object by the peak value determination of the above Step S4. Accordingly, in a case where all of the eigenvalues $\lambda_1$ to $\lambda_6$ is smaller than Te in the above Step S8, that is, in a case where the number of incident signals K is 0, it can be considered that the false determination is made by the influence such as noises.

In such a case, as shown in Step S12 and Step S13, K is corrected to 1, and $\lambda_1$ that is the largest eigenvalue is regarded as the signal eigenvalue. With such a correction, it is possible to accurately estimate the number of incident signals K without mistaking the number of incident signals K due to an influence such as noises.

As described above, the CPU 1 calculates the MUSIC spectrum according to the general MUSIC method using the eigenvalues $\lambda_1$ to $\lambda_6$ that have been determined as the signal eigenvalues and the noise eigenvalues, and the eigenvectors $e_1$ to $e_6$ in Step S14. As described above, because the receiving antennas 6(1) to 6(6) are linearly arranged at intervals of the distance d, the steering vector a(θ) of 6×1 order with respect to the orientation angle θ is defined as the following Equation (7).

$$a(\theta) = \begin{bmatrix} 1 \\ \exp(j\Delta\phi) \\ \exp(j2\Delta\phi) \\ \exp(j3\Delta\phi) \\ \exp(j4\Delta\phi) \\ \exp(j5\Delta\phi) \end{bmatrix}, \Delta\phi = 2\pi\frac{d}{\lambda}\sin\theta \quad (7)$$

Then, the MUSIC spectrum Pm(θ) is calculated by the following Equation (8).

$$P_m(\theta) = \frac{\|a(\theta)\|^2}{\sum_{i=K+1}^{6} |e_i^H a(\theta)|^2} \quad (8)$$

Figure 4:
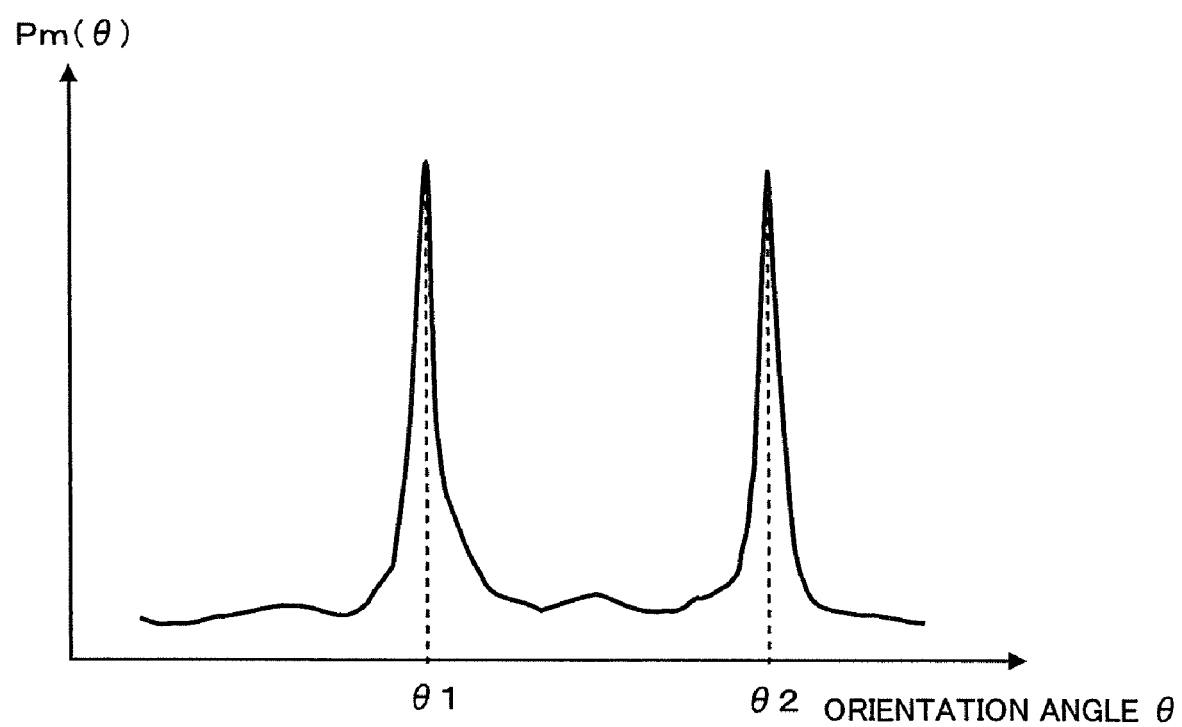
FIG. 4 is a diagram showing the calculation results of MUSIC spectrum $Pm(\theta)$ according to the first embodiment of the present invention.

In the above Equation (8), $ei^H$ represents the complex conjugate transposition of the eigenvector ei. FIG. 4 is a diagram showing the calculation results of the MUSIC spectrum Pm(θ) according to the first embodiment of the present invention, which exemplifies the MUSIC spectrum Pm(θ) in a case where the number of incident signals K=2.

Subsequently, in Step S15, the CPU 1 calculates the K orientation angles based on the MUSIC spectrum. First, the CPU 1 calculates the orientation angle at which the MUSIC spectrum becomes peak. More specifically, in a case where the MUSIC spectrum of the subject orientation angle is larger than the MUSIC spectra of the orientation angle before and after the subject orientation angle, the orientation angle is set as the peak orientation angle.

K peak orientation angles having the larger MUSIC spectrums are set in descending order of the MUSIC spectrum as the orientation angles of the target object among the peak orientation angles thus extracted. In the above example of FIG. 4, θ1 and θ2 are calculated as the orientation angles of the two target objects.

The CPU 1 repeats the above-described processing of Steps S6 to S15 for the number of target objects (Step S16), calculates the distance, the relative velocity, and the orientation angle of all the target objects as the target object information, and outputs the calculated target object information to an external device (not shown).

As described above, according to the first embodiment, the peak signal and the noise level are extracted from the observation signal including the information on the target object, and the number of the signal eigenvalues is obtained based on the noise level using the covariance matrix that has been generated based on the extracted peak signal, thereby enabling the number of incident signals to be estimated from the number of the signal eigenvalues. As a result, it is possible to reduce the data acquiring time, and to accurately estimate the number of the incident signals while responding to the characteristic change due to the temperature change or the like. Further, because it is unnecessary to analyze the eigenvalue in a state where there is no observation signal, it is possible to reduce the operation time.

In the above embodiment, the case where six receiving antennas are disposed is described as an example. However, it is needless to say that the receiving antennas of different number can be also applied to the present invention in exactly the same way. Moreover, in the above embodiment, the MUSIC method is used in calculation of the orientation angle. Alternatively, the present invention can be applied to the frequency modulation radar device using other methods, for example, an ESPRIT method.

In addition, in the above embodiment, as a system of detecting the distance and the relative velocity of the target object, the FMCW system is used. Alternatively, the present invention can be applied to a frequency modulation radar device that modulates the transmitting signal in pulses.

What is claimed is:

1. A frequency modulation radar device, comprising:
   transmitting means for transmitting a transmitting signal that has been modulated in frequency so as to change a frequency at a constant change rate with time;
   M receiving means for receiving a reflected signal resulting from reflecting the transmitting signal by a target object as M channels, where M is an integer of 2 or larger;
   mixing means for mixing the transmitting signal with the M received signals, respectively, to obtain beat signals for the M channels;
   frequency analyzing means for analyzing the beat signals for the M channels in frequency; and
   calculating means for calculating a distance to the target object and an orientation angle based on frequency analysis results for the M channels,
   wherein the calculating means calculates a noise level from the frequency analysis result for the M channels, extracts a peak signal of a subject target object in each of the channels based on the calculated noise level to generate a covariance matrix of M×M order, discriminates between a signal eigenvalue corresponding to the target object and a noise eigenvalue corresponding to noises among M eigenvalues of the covariance matrix based on the noise level, estimates the number of incident signals K, where K is an integer that is equal to or larger than 1 but smaller than M, from the number of the discriminated signal eigenvalues, and calculates the orientation angles of the respective K incident signals to estimate the orientation angle of the target object.

2. The frequency modulation radar device according to claim 1, wherein the calculating means calculates a square mean value of absolute values of components corresponding to noises of the frequency analysis results for the M channels as the noise level.

3. The frequency modulation radar device according to claim 1, wherein the calculating means sets a value obtained by multiplying the noise level by a given value as a eigenvalue discrimination threshold value, and discriminates between the signal eigenvalue and the noise eigenvalue based on a magnitude of the respective M eigenvalues relative to the eigenvalue discrimination threshold value.

4. The frequency modulation radar device according to claim 1, wherein the calculating means estimates the number of incident signals K as M−1 in a case where the number of signal eigenvalues that are obtained as the result of discriminating between the signal eigenvalue and the noise eigenvalue is equal to the number of the receiving means M, and regards the smallest eigenvalue among the M eigenvalues as the noise eigenvalue.

5. The frequency modulation radar device according to claim 1, wherein the calculating means estimates the number of incident signals K as 1 in a case where the number of signal eigenvalues that are obtained by the result of discriminating between the signal eigenvalue and the noise eigenvalue is equal to 0, and regards the largest eigenvalue among the M eigenvalues as the signal eigenvalue.

6. The frequency modulation radar device according to claim 2, wherein the calculating means sets a value obtained by multiplying the noise level by a given value as a eigenvalue discrimination threshold value, and discriminates between the signal eigenvalue and the noise eigenvalue based on a magnitude of the respective M eigenvalues relative to the eigenvalue discrimination threshold value.

7. The frequency modulation radar device according to claim 2, wherein the calculating means estimates the number of incident signals K as M−1 in a case where the number of signal eigenvalues that are obtained as the result of discriminating between the signal eigenvalue and the noise eigenvalue is equal to the number of the receiving means M, and regards the smallest eigenvalue among the M eigenvalues as the noise eigenvalue.

8. The frequency modulation radar device according to claim 3, wherein the calculating means estimates the number of incident signals K as M−1 in a case where the number of signal eigenvalues that are obtained as the result of discriminating between the signal eigenvalue and the noise eigenvalue is equal to the number of the receiving means M, and regards the smallest eigenvalue among the M eigenvalues as the noise eigenvalue.

9. The frequency modulation radar device according to claim 2, wherein the calculating means estimates the number of incident signals K as 1 in a case where the number of signal eigenvalues that are obtained by the result of discriminating between the signal eigenvalue and the noise eigenvalue is equal to 0, and regards the largest eigenvalue among the M eigenvalues as the signal eigenvalue.

10. The frequency modulation radar device according to claim 3, wherein the calculating means estimates the number of incident signals K as 1 in a case where the number of signal eigenvalues that are obtained by the result of discriminating between the signal eigenvalue and the noise eigenvalue is equal to 0, and regards the largest eigenvalue among the M eigenvalues as the signal eigenvalue.

11. The frequency modulation radar device according to claim 4, wherein the calculating means estimates the number of incident signals K as 1 in a case where the number of signal eigenvalues that are obtained by the result of discriminating between the signal eigenvalue and the noise eigenvalue is equal to 0, and regards the largest eigenvalue among the M eigenvalues as the signal eigenvalue.

* * * * *